United States Patent [19]

Niwa et al.

[11] 4,222,649
[45] Sep. 16, 1980

[54] PHOTOGRAPHIC FILM WIND-UP AND SHUTTER CHARGE MECHANISM

[75] Inventors: Masatake Niwa; Norihiro Inoue; Kunio Kawamura, all of Sakai; Norio Beppu, Senman all of Japan

[73] Assignee: Minolta Camera Kabushiki Kaisha, Osaka, Japan

[21] Appl. No.: 879,109

[22] Filed: Feb. 17, 1978

[30] Foreign Application Priority Data

Feb. 17, 1977 [JP] Japan .................................. 52-16819
Feb. 28, 1977 [JP] Japan .................................. 52-21675

[51] Int. Cl.² .............................................. G03B 1/18
[52] U.S. Cl. ..................................... 354/173; 354/295
[58] Field of Search ............... 354/171, 173, 212, 213, 354/288, 295, 204–206, 60 R; 339/182 R, 183; 200/19 R, 33 R; 242/71.4, 71.5; 361/205

[56] References Cited

U.S. PATENT DOCUMENTS

| | | | |
|---|---|---|---|
| 3,882,516 | 5/1975 | Ogiso et al. ........................... | 354/173 |
| 3,968,509 | 7/1976 | Winkler et al. ........................ | 354/213 |
| 4,042,942 | 8/1977 | Haraguchi ............................ | 354/171 |
| 4,068,243 | 1/1978 | Kozuki et al. ........................ | 354/60 R |
| 4,084,169 | 4/1978 | Iwata et al. ........................... | 354/173 |
| 4,086,603 | 4/1978 | Kozuki et al. ..................... | 354/173 X |

FOREIGN PATENT DOCUMENTS

| | | | |
|---|---|---|---|
| 244851 | 1/1961 | Australia ................................. | 339/183 |
| 2644184 | 4/1977 | Fed. Rep. of Germany ........... | 354/173 |

*Primary Examiner*—L. T. Hix
*Assistant Examiner*—William B. Perkey
*Attorney, Agent, or Firm*—Wenderoth, Lind & Ponack

[57] ABSTRACT

An electrical drive which includes a motor for actuation of a film wind-up and shutter mechanism subsequent to exposure of a film frame and a mechanism for decoupling drive from the motor at the end of each wind-up and shutter charge action and also during this action if something occurs a fault preventing correct action of the film wind-up and shutter charge mechanism, whereby damage to the mechanism, the motor and film is prevented. The drive is correctly positioned with respect to a camera by a mechanism which also serves to provide electrical connection between a shutter control circuit and a drive control circuit, whereby the number of elements required to be precisely positioned with respect to the camera is less and manufacturing and assembly cost is reduced.

14 Claims, 16 Drawing Figures

PHOTOGRAPHIC FILM WIND-UP AND SHUTTER CHARGE MECHANISM

The present invention relates to an electrically actuated drive means adapted to be removably coupled to a photographic camera for actuation of a mechanism for effecting film wind-up and shutter charge action in a photographic camera. More particularly, the present invention relates to an electric connection between the photographic camera and the electrically actuated drive means which is necessary to establish an electric signal transmission path therebetween.

There is widely used in association with a photographic camera a mechanism for effecting, after exposure of each film frame, wind-up of film to bring a succeeding frame to a position for exposure to light reflected from a scene to be photographed and, simultaneously therewith, for effecting a so-called "shutter charge", i.e., bringing the camera shutter to a condition in which it is ready to be actuated to effect exposure of the succeeding frame.

The film wind-up and shutter charge drive mechanism heretofore manufactured has a positioning element necessary to accurately position the drive mechanism in the photographic camera when the former is coupled to the latter. At the same time, in order for the photographic camera to have the drive mechanism coupled thereto, the photographic camera also has a positioning element cooperative with the positioning element in the drive mechanism. In addition thereto, separately from the positioning elements in the respective camera and the drive mechanism, the camera and the drive mechanism are provided with electric terminal elements which, when the drive mechanism is coupled to the camera with the respective positioning elements engaged with each other, establish an electric signal transmission path between the camera and the drive mechanism.

In order to assure that the drive mechanism is accurately positioned relative to the photographic camera with the electric terminal elements in the drive mechanism exactly engaged with the electric terminal elements in the photographic camera, the positioning elements and the electric terminal elements have heretofore been precisely arranged and defined on the respective photographic camera and the drive mechanism. The precise arrangement requires a time-consuming and costly manufacturing procedure.

In addition, conventionally, such drive mechanism are designed to terminate drive to the wind-up and charge mechanism upon termination of the wind-up and shutter charge action. This is satisfactory when the wind-up and charge mechanism functions correctly and there is no hindrance to forwarding of film, but if a malfunction of the wind-up and charge mechanism or a hindrance to forwarding of the film occurs while film wind-up and shutter charge action is in progress, damage to the motor or other related parts of the drive mechanism, damage to the wind-up and charge mechanism, or damage, such as tearing, to the film may easily result. Also, if such a fault occurs, since the drive means is usually halted before completion of the action normally effected thereby as well as correction of elements in the camera proper, it is subsequently necessary to effect precise adjustment to bring elements of the drive mechanism to initial settings for correct engagement of mechanism elements in the camera, and these adjustments require use of a skilled staff. Precise adjustment and positioning of the drive mechanism relative to the mechanism elements in the camera is also necessary in initial fitting of the drive mechanism to the camera as hereinbefore described, and this necessity for precise adjustment and positioning is a factor in increased cost in the camera manufacture and assembly.

It is accordingly an essential object of the present invention to provide an electric connection between the drive mechanism and the camera which has a simple construction and and can be manufactured with a minimum number of parts without incurring any undue cost.

It is another important object of the present invention to provide an electric connection of the type referred to above, which serves not only as an electrical signal transmission path between the drive mechanism and the camera, but also as positioning means by which the drive mechanism can accurately be positioned relative to the camera.

It is a further object of the present invention to provide a film wind-up and shutter charge mechanism drive means which automatically decouples the motor drive from a film wind-up and shutter charge mechanism upon completion of film wind-up and shutter charge action or upon malfunction of the wind-up and charge mechanism or hindrance to film movement.

It is a still further object of the present invention to provide a film wind-up shutter charge mechanism drive means comprising means for effecting automatic return to initial positions of elements of the drive means required to connect the drive means to elements of a wind-up and charge mechanism in the camera.

It is a further object of the present invention to provide a film wind-up and shutter charge mechanism drive means in which the number of parts requiring precise positioning with respect to a wind-up and charge mechanism in a camera are fewer than in conventional means, whereby manufacturing and assembly costs are reduced.

According to the present invention, there is provided means for positioning either the camera or the drive means relative to the other camera and the drive means in a position with a coupling member of the camera operatively coupled to a corresponding coupling member of the drive means. This positioning means is concurrently utilized as means for electrically connecting an electric circuit built in the camera to an electric circuit built in the drive means.

Furthermore, according to the present invention, there is provided a film wind-up and shutter charge mechanism drive means comprising a drive motor from which drive to actuate a film wind-up and shutter charge mechanism is transmitted through a clutch means which is decoupled when the wind-up and charge mechanism is stopped. The portion of the drive means which is connected to the wind-up and shutter charge mechanism provided in the camera is provided on the output side of the above described clutch and comprises spring means which returns elements of this portion to initial positions upon completion of each film wind-up and shutter charge action, or if a fault occurs, subsequent to stoppage of the film wind-up and shutter charge mechanism or to detachment of the drive means from the camera.

As an essential feature of the present invention, since the positioning means necessary to accurately position the drive means relative to the camera when the both are coupled to each other concurrently serves as an electric connection terminal assembly, the number of elements required can advantageously be minimized and, also, the assembly can be effected in a simplified manner with no increase in cost.

A better understanding of the present invention may be had from the following full description of several preferred embodiments thereof when read with reference to the accompanying drawings, in which:

FIGS. 2(a)–(2d) are a series of detail views showing the decoupling action of a clutch means of the means of FIG. 1;

Before the description of the present invention proceeds, it is to be noted that like parts are designated by like reference numerals throughout the accompanying drawings.

Figure 1:
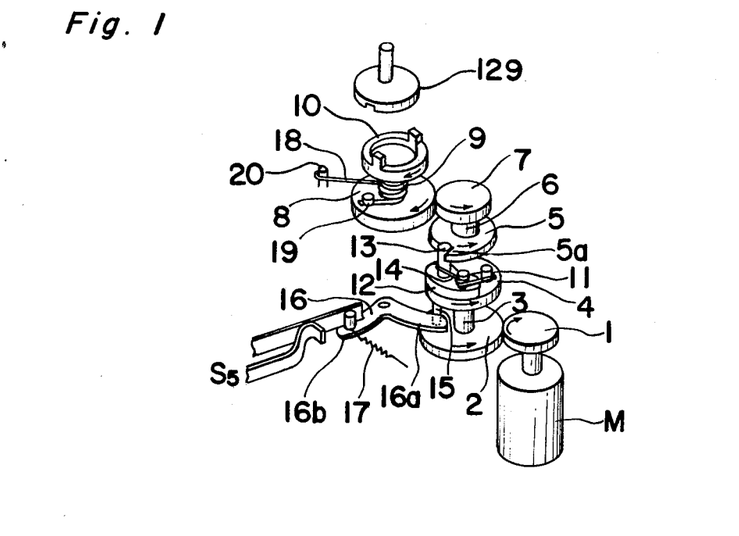
FIG. 1 is a perspective view showing the main elements of a film wind-up and shutter charge mechanism drive means according to a first embodiment of the present invention.

Referring to FIG. 1, a first gear 1 which is fixedly mounted on the output shaft of drive motor M engages and drives second gear 2. Second gear 2 is fixedly and coaxially connected to roller support plate 4 by shaft 3 whereby plate 4 also is caused to rotate by rotation of first drive gear 1, first drive gear 1 rotating clockwise and second gear 2 and roller support plate 4 rotating counterclockwise upon actuation of drive motor M, and plate 4 being above second gear 2 as seen in the drawing. Projecting downwardly from the lower surface of roller support plate 4 is a fixed pin 15 which, each time the plate 4 undergoes one complete rotation, contacts the arm 16a of a pivotally mounted lever 16 and causes lever 16 to pivot clockwise against the force of a spring 17 connected to the other arm 16b of lever 16. Lever arm 16b is engageable with a spring contact of a normally closed switch S5, which is included in a control circuit described later, and when lever arm 16a is not pushed by pin 15, spring 17 causes lever 16 to pivot to a position in which the spring contact of switch S5 contacts a fixed contact of switch S5 which is therefore closed. When, however, pin 15 causes lever 16 to pivot clockwise, lever arm 16b pushes the spring contact away from the fixed contact of switch S5 whereby switch S5 is opened.

Fixedly attached to a peripheral portion of the upper surface of roller support plate 4 is a pin 11 to which is pivotally attached one end of generally elliptical roller holder 12, which lies flat with respect to the upper surface of support plate 4, and to the opposite end of which is rotatably attached a roller 13, the axis of rotation of roller 13 being vertical. A wire spring 14 having a central portion wrapped around pivot pin 11 has one end connected to roller 13 and the other end connected to a stud which is fixedly attached to the upper surface of support plate 4. Spring 14 exerts a constant force to cause roller holder 12 to pivot clockwise about pin 11, whereby roller 13 is normally brought into contact with an engagement portion 5a which is constituted by a peripheral projection on a drive transmission cam 5, and which has an inwardly curved surface portion, which is the portion thereof which is normally contacted by roller 13, and an outer surface portion in the shape of a curve which is a smooth continuation of the periphery of the main portion of cam 5. Support plate 4, roller holder 12, roller 13, spring 14 and cam 15 together constitute a clutch means, which, as described in detail later, is uncoupled upon imposition of extra load of motor M.

Drive transmission cam 5 is fixedly and coaxially connected by shaft 6 to third gear 7 which engages and drives fourth gear 8, which is fixedly and coaxially connected to coupling element 10 by shaft 9. Coupling element 10 is connected to a coupling element 129 constituting the input end of a mechanism which is mounted in the camera and may be a conventionally known mechanism or a mechanism such as employed in another embodiment of the present invention described later, and serves to convert rotary movement to linear movement in order to effect forward movement of a reciprocally movable means for effecting film wind-up and shutter charge. A spring element 18 is wound around shaft 9 and has one end affixed to a pin 19 which is fixedly attached to the upper surface of fourth gear 8 and the opposite end attached to a pin 20 which is fixedly attached to a fixed portion of the container for the electrical wind-up and shutter charge means. Spring element 18 is tensed by rotation of fourth gear 8 in the direction to cause film wind-up and shutter charge action, and serves to return coupling element 10, fourth gear 8, third gear 7 and drive gear transmission cam 5 to initial positions upon completion of this action.

Figures 2A, 2B, 2C, 2D:
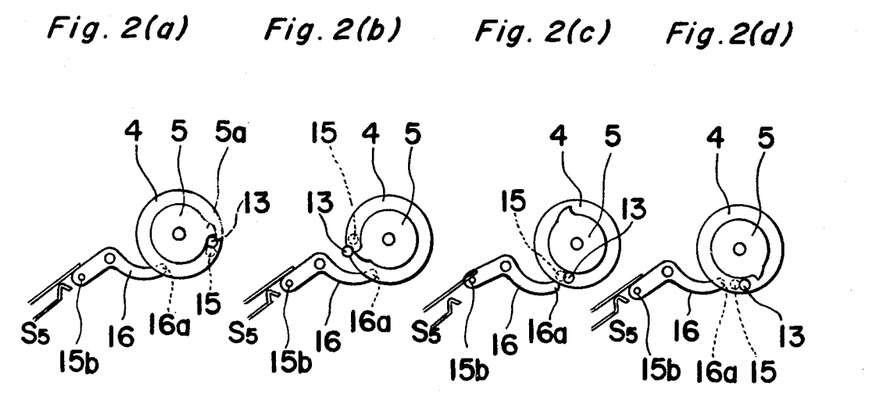

Referring to FIGS. 1 and 2, the above described means functions as follows. Between film wind-up and shutter charge action, as shown in FIG. 2(d), roller 13 is close to, but not completely in contact with the inwardly curved portion of engagement projection 5a of drive transmission cam 5 and pin 15 projecting downwardly from roller support plate 4 is in a position such that plate 4 must rotate almost one complete revolution in the direction for effecting film wind-up and shutter charge action before pin 15 comes into contact with arm 16a of lever 16 actuable to open switch S5. When drive motor M is actuated, plate 4 is rotated counterclockwise and roller 13 contacts engagement portion 5a of cam 5, as shown in FIG. 2(a), whereby cam 5 and associated elements including coupling elememts 10 and 129 also are driven to effect film wind-up and shutter charge action. Pawl means (not shown) prevents reverse movement of the above described reciprocally movable means for effecting film wind-up and shutter charge action during film wind-up and shutter charge action, but becomes ineffective in preventing reverse movement upon completion of this action whereby reverse rotation of the coupling element 129 becomes possible.

Presuming that the camera mechanism functions correctly, this action is completed before cam 5 has been rotated one complete revolution, with the result that since cam 5 can no longer be rotated counterclockwise but drive motor M is still actuated and roller support plate 4 is still rotated, roller 13 is forced to move past engagement projection 5a, as shown in FIG. 2(b), roller holder 12 being pivoted counterclockwise about pin 11 against the force of spring 14. After passing engagement projection 5a, roller 13 simply rollers along the periphery of the main portion of cam 5, i.e., drive transmission connection between motor M and coupling elements 10 and 129 is terminated. Since, however, motor M is still actuated, support plate 4 is rotated further whereby, as shown in FIG. 2(c), pin 15 is brought into contact with arm 16a of lever 16 and lever 16 is pivoted and opens switch S5, whereupon motor M is stopped. There is, however, a small amount of further rotation of plate 4 due to inertia and pin 15 is brought to a position in which it no longer engages lever 16 which is, therefore, moved by spring 17 to close switch S5 again. During this action, spring 18 provided around shaft 9 connecting fourth gear 8 and coupling element 10 is unopposed and returns coupling element 10, gears 7 and 8, and cam 5 to initial position whereby engagement projection 5a is again brought to the position ready for engagement by roller 13 shown in FIG. 2(d).

The above described action is the action which is effected during normal functioning of the wind-up and shutter charge means in the camera. However, if a malfunction or blockage occurs at any time during wind-up and film charge action, roller 13 is moved past and out of engagement with engagement projection 5a in the same manner as hereinabove described, thus avoiding imposition of drive to forcibly move and possibly cause damage to motor M, wind-up and shutter charge means or film in the camera, and then switch S5 is again opened to stop motor M. Also, spring 18 again returns elements to their initial positions, either immediately, or as soon as the means of FIG. 1 is removed from the camera and thus coupling element 10 is automatically brought to the correct position for engagement with coupling element 129.

Figure 3:
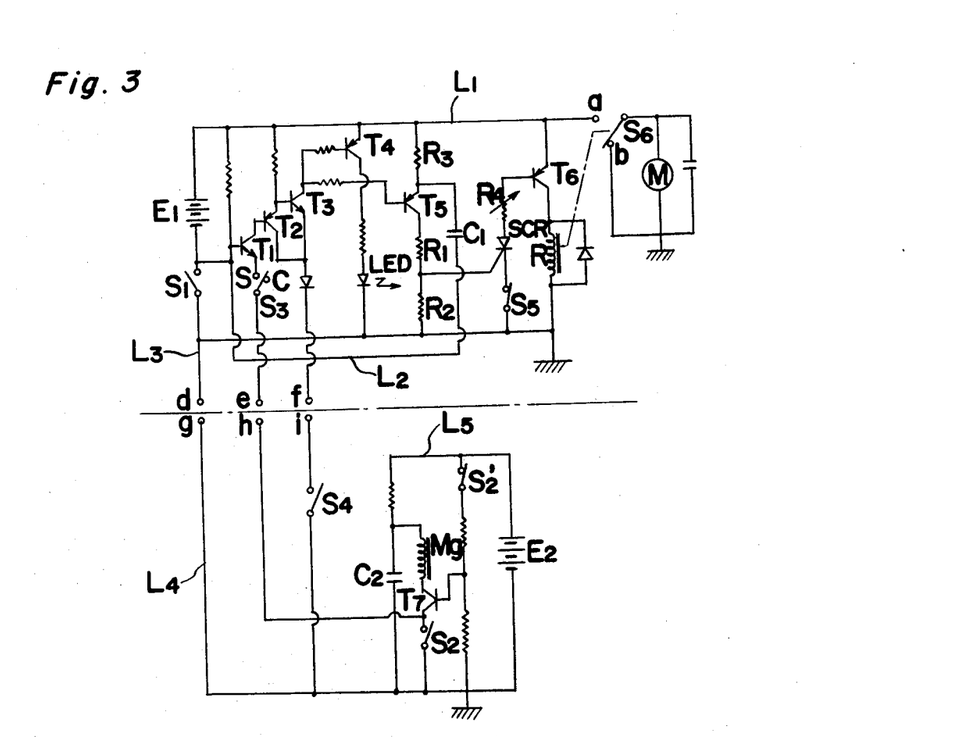
FIG. 3 is a circuit diagram of a control and actuation circuit employable in the means of FIG. 1.

The means of FIG. 1 may be suitably associated with the control circuit of FIG. 3 to which reference is now made.

In FIG. 3, the upper portion of the circuit shown above the chain-dot line is the circuit provided inside the wind-up and shutter charge means, referred to as circuit I hereinafter, and the circuit below the chain-dot line is the circuit provided in the camera proper referred to hereinafter as circuit II. Circuit I comprises voltage source E1 having a positive terminal connected to line L1, and a negative terminal connected directly to line L2 and through normally open switch S1 to line L3 and to terminal d for connection to circuit II. NPN transistor T1 has the base connected to line L1, the collector connected to the base of PNP transistor T2 and the emitter connected through normally open switch S3 to terminal e for connection to circuit II. Switch S3 is closed when it is on contact s for taking of photographs one frame at a time, and is opened when it is on contact c, for taking continuous photographs. The collector of transistor T2 is connected to the emitter of NPN transistor T3 and through a diode to terminal f for connection to circuit II and the emitter thereof is connected to L1 through a suitable resistor and to the base of transistor T3. The collector of transistor T3 is connected to the bases of PNP transistors T4 and T5. The emitter of transistor T4 is connected to line L1 and the collector thereof is connected through light-emitting diode LED to line L3. The emitter of transistor T3 is connected through resistor R3 to line L2 and through capacitor C1 to line L2, and the collector thereof is connected through a series circuit of resistors R1 and R2 to line L3. The junction of resistors R1 and R2 is connected to the gate of silicon controlled rectifier SCR having a cathode connected through normally closed switch S5 to line L3 and an anode connected through variable resistor R4 to the base of NPN transistor T6. The emitter of transistor T6 is connected to line L1 and the collector thereof is connected to the upper end of relay coil R which is in parallel to a diode and has a lower end connected to line L3 and ground, these elements constituting a switching circuit for control of switch S6 which serves to conect motor M to the rest of the circuit I including voltage source E1, which is normally closed on contact b and which, upon energization of relay R, is moved to contact a connected to line L1. The armature of motor M is connected at one end to switch S6 and at the other end to ground, and motor M is connected to voltage source E1 when switch S6 is closed on contact a and disconnected when switch S6 is closed on contact b.

Circuit II comprises terminals g, h and i which are connected in a manner described later to terminals d, e and f, respectively, of circuit I whereby connection between circuits I and II is established. Terminal g is connected directly and terminal i is connected through normally open switch S4 to line L4 leading to the negative terminal of voltage source E2. Terminal h is connected to the emitter of NPN transistor T7, the emitter of transistor T7 being also connected through normally open switch S2 to line L4, the base thereof being connected to the junction of a series resistor circuit having a lower end connected to ground and an upper end connected through normally closed switch S'2 to line L5 leading to the positive terminal of voltage source E2. The collector of the transistor T7 is connected to the lower end of the coil of an electromagnet Mg for shutter release, the upper end of this coil being connected to line L5. The series circuit including electromagnet Mg, transistor T7 and switch S2, which is thus in parallel with voltage source Es, is also in parallel with capacitor C2 having opposite terminals connected respectively to lines L4 and L5.

In circuits I and II, switch S1 is the power supply switch of the electrical wind-up means and may be closed manually or may be so provided that it is closed when the electrical wind-up means is mounted on the camera. Switch S2 is a release switch which is closed while the camera shutter button (not shown) is held depressed. Switch S3 is an externally actuable switch for selection of continuous photographing or single-frame photographing. Switch S4 is closed only during disengagement from the wind-up and shutter charging means of a wind-up stop means, such as described later in reference to another embodiment of the present invention. That is, switch S4 is open during shutter action to expose a film frame, is closed upon completion of this action, remains closed during wind-up and shutter charge action and then is opened again. Normally closed switch S5 is opened due to actuation of lever 16 by pin 15 as described hereinbefore with reference to FIG. 1.

Transistors T1 and T2 conduct when switches S1 and S2 are closed and switch S3 is switched to single-frame contact s. Transistor T3 can be made conductive by closure of switch S4, but only when switch S1 is closed and transistor T2 is cut off. Transistor T4 is made conductive upon conduction of transistor T3 and when conductive causes light-emitting diode LED to light up to give an indication to the photographer that film wind-up and shutter charge are in progress. Transistor T5 also is made conductive by conduction of transistor T3 and together with resistors R1 and R2 constitutes a discharge circuit for discharge of charge stored in capacitor C1. In the absence of conduction by the various transistors, capacitors C1 and C2 in the circuits I and II are charged, since they are connected directly to their respective voltage sources E1 and E2. Silicon controlled rectifier SCR, which serves to control transistor T6, is rendered conductive by input supplied to the gate thereof from the junction of resistors R1 and R2 upon discharge of charge from capacitor C1, but is cut off when switch S5 is opened by lever 16 at the end of wind-up and shutter charge action. During conduction of silicon controlled rectifier SCR, transistor T6 conducts, thereby energizing relay R and causing switch S6 to move to contact a and connect motor M to voltage source E1.

In circuit II, if the shutter button is actuated and switch S2 is closed while switch S'2 is closed, i.e., at a time when previous wind-up and shutter charge action has been completed, transistor T7 conducts, permitting capacitor C2 to discharge through electromagnet Mg, which is thereby energized, and causes action of a camera shutter (not shown) in a known manner.

In FIGS. 1, 2 and 3, action of the above described circuit is as follows, it being first presumed that it is desired to take photographs in continuous succession and switch S3 is switched to contact c, that power switch S1 is closed and that wind-up and shutter charge action effected subsequent to taking of a previous photograph has been completed. In this condition, the clutch means constituted by roller 13, cam 5, etc. is in the condition shown in FIG. 2(d) and, with the exception of switch S1, which is closed, the various switches of circuits I and II are in the positions shown in FIG. 3. When the shutter button is depressed, switch S2 is closed, transistor T7 conducts, previously charged capacitor C2 discharges and shutter action to permit exposure of a film frame is effected by energization of electromagnet Mg. When the shutter closes and exposure of the film frame is completed, the above described stop means is moved to a disengagement position and switch S4 is closed. Since switch S3 is closed on contact c, transistors T1 and T2 are cut off, and closure of switch S4 therefore causes transistor T2 to conduct, whereupon transistor T5 also conducts and previously charged capacitor C1 discharges, resulting in a flow of current through transistor T5 which is temporarily large enough to produce a voltage at the junction of resistors R1 and R2 sufficiently great to trigger silicon controlled rectifier SCR, thus causing conduction of transistor T6, energization of relay R, and changeover of switch S6 to contact a, and actuation of motor M to drive the means of FIG. 1. Subsequently, the series switching circuit including relay R, transistor T6, silicon controlled rectifier SCR and switch S5 acts as a self-maintaining circuit which maintains relay R energized, and hence holds switch S6 on contact a, until switch S5 is opened by lever 16. Conduction of transistor T3 also causes conduction of transistor T4, resulting in lighting of light emitting diode LED to give an indication that the means of FIG. 1 is being actuated and film wind-up and shutter charge action is in progress, the condition of the clutch means being as shown in FIGS. 2(a). When this action commences switch S'2 is opened and, as this results in effective cancellation of bias voltage between base and emitter of transistor T7, conduction of transistor T7 and energization of shutter control electromagnet Mg are temporarily stopped and capacitor C2 is again charged.

When the coupling element 129 (FIG. 1) has been rotated a sufficient distance for wind-up and shutter charge action to have been completed, the above described stop means (not shown) becomes effective to stop forward movement of the film wind-up and shutter charge mechanism, rotation of coupling element 129 is stopped, roller 13 rides over engagement projection 5a of cam 5, and pin 15 causes lever 16 to open switch S5 (FIGS. 2(b) and 2(c)). In FIG. 3, opening of switch S5 opens the actuation circuit of relay R, which is therefore deenergized, and permits switch S6 to return to contact b, thus terminating action of drive motor M. At the same time the above described stop means is brought into an engagement position and switch S4 is simultaneously opened, thus cutting off transistors T3, T4 and T5, whereupon light emitting diode LED stops emitting light for the wind-up and shutter charge indication, and recharging of capacitor C1 commences. Subsequently, switch S5 is reclosed when pin 15 moves to the position of FIG. 2(d).

As noted, conduction of transistor T7 is temporarily stopped during film wind-up and shutter charge action because of the opening of switch S'2. However, upon completion of this action, switch S'2 is again closed and, therefore, if the shutter button is held depressed and switch S2 is held closed, the above described action is repeated to cause exposure of a continuous succession of film frames.

If only one frame of a film is to be photographed, initial conditions in the circuit of FIG. 3 are the same as described above except that switch S3 is closed on contact s instead of on contact c. In this case, when the shutter button is depressed to cause shutter action to expose a film frame, closure of switch S2 results in conduction of transistors T1 and T2. Therefore, when shutter action to expose the film frame is completed, even though switch S4 is closed, transistor T3 does not conduct, transistor T5 does not conduct and capacitor C1 is not discharged to trigger silicon controlled rectifier SCR, and thus film wind-up and shutter charge are not immediately effected. However, when the shutter button is released, switch S2 is opened, transistors T1 and T2 are cut-off, transistor T3 becomes conductive, and the above described film wind-up and shutter charge action is effected. In other words, for single-frame photography, film wind-up and shutter charge are not effected until the camera shutter is released. After completion of wind-up and charge action, the control circuit is not re-actuated since switch S4 in addition to switch S2 is opened.

In the above described circuit, if a fault in the wind-up and charge mechanism occurs and wind-up and shutter charge action fails to be completed, motor M remains actuated until switch S5 is opened by lever 16 as described above. Subsequent to this, even if the shutter button is held depressed in order to expose a continuous succession of film frames, although switch S4 remains closed, there is no re-actuation of electromagnet Mg, since switch S'2 is open and, even though switch S5 is reclosed after being opened, there is not reactuation of motor M, since transistor T5 continues to conduct and it is therefore not possible for capacitor C1 to charge and subsequently discharge to trigger silicon controlled rectifier SCR. On the other hand, since transistor T4 also continues to conduct, light emitting diode LED remains continuously actuated, thus giving an indication to the photographer that a fault has occurred.

Figure 4A:
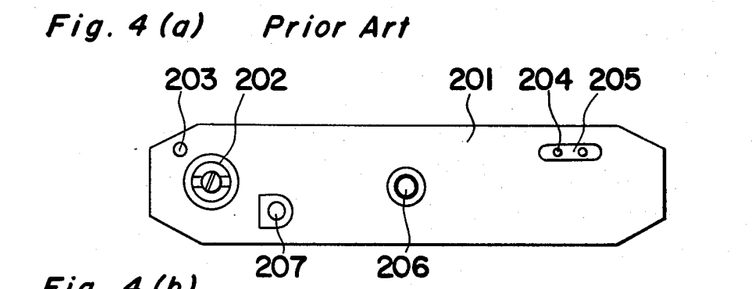
FIGS. 4(a) and 4(b) are plan views showing the disposition of positioning elements and electrical connection elements in conventional means for driving a film wind-up and shutter charge mechanism and drive means according to the present invention, respectively.

Referring now to FIG. 4(a), conventional means comprises, provided in connection with the main body 201 of a camera, a wind-up coupling portion 202, a wind-back release button 207, a tripod screw element 206, a positioning element 203, and contacts 204 which serve for transmission of signals between the circuit of means for driving a film wind-up and shutter charge mechamism and an associated circuit provided in the camera, and which is usually insulated from the camera main body 201 by insulating element 205. In the assembly of such a means, it is necessary to ensure precise positioning of the positioning element 203, signal transmission elements 204, and tripod screw element 206.

Figure 4B:
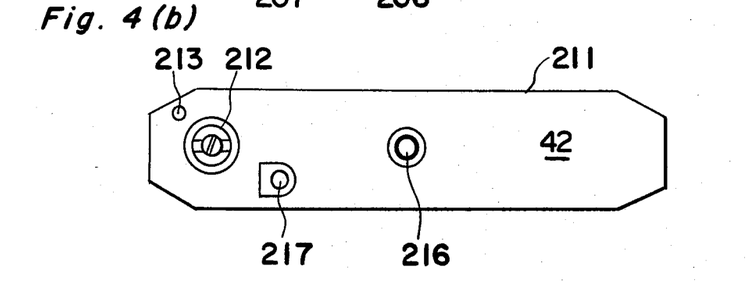

In FIG. 4(b), means according to the invention similarly comprises wind-up connection portion 212, positioning element 213, wind-back release button 217, and tripod screw element 216, but signal transmission contacts are included in positioning element 213, whereby assembly is simplified since the number of parts required to be positioned with great precision is less.

Figures 5, 6:
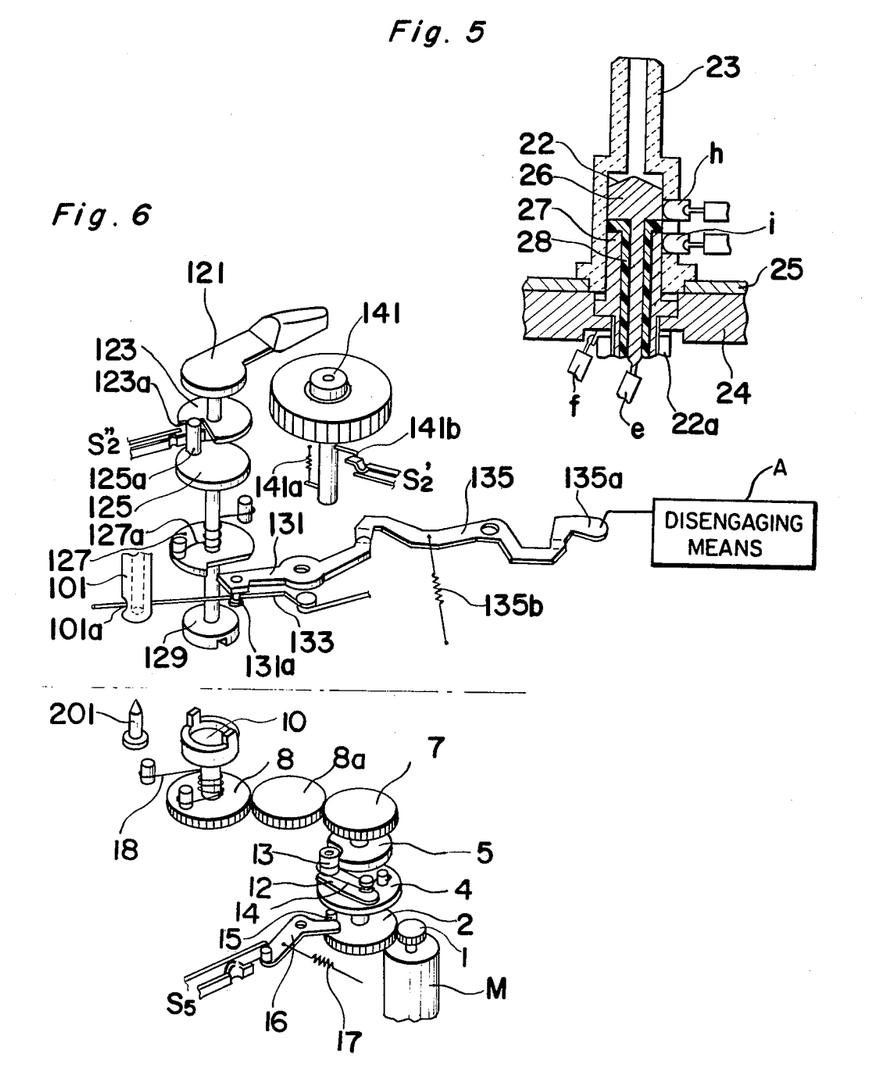
FIG. 5 is a detailed sectional view of positioning and electrical connection means according to the present invention.
FIG. 6 is a perspective view of another embodiment of the present invention and associated film wind-up and shutter charge elements.

The structure of signal transmission contacts is shown in greater detail in FIG. 5. Guide element 23 is fixed in the camera and has an outer end portion which fits into a hole in the lower wall cover 25 of the camera and has an outer surface level with that of cover 25. Case 24 of the electrical drive means for actuation of the film wind-up and shutter charge mechanism has therein an opening in which is fixedly attached a positioning element 22, which extends beyond both sides of the opening, and is suitably fixed to case 24 by screw means 22a. Positioning element 22 fits into the hollow recess in guide element 23, and serves together with positioning element 213 of FIG. 4(b) to accurately position the wind-up and charge mechanism drive means with respect to the camera, and the portion thereof shown in the drawing has conductive portions 26 and 27 and insulation portion 28. Conductive portion 26 comprises a rod-like portion which is central with respect to positioning element 22 and a large diameter portion, which is integrally attached to the rod like portion, has a diameter matching the inner diameter of guide element 23, and with respect to guide element 23 is the innermost portion of positioning element 22. Conductive portion 27 has a length equal to that of, and is disposed around and parallel to the rod-like central portion of conductive portion 26. Insulation portion 28 separates conductive portions 26 and 27. When positioning element 22 is fitted in guide element 23, the end of conductive portion 26 which is external to camera cover 25 contacts terminal h of the portion of the circuit shown in FIG. 3 which is mounted in the camera 24, and the end thereof which is innermost with respect to guide element 23 is connected to terminal e which is included in the portion of the same circuit which is mounted in the wind-up and charge mechanism drive means, and which extends through an opening defined in a wall portion of guide element 23. Conductive portion 27 similarly provides electrical connection between terminals f and i. Terminals d and g are grounded and adapted to be connected to each other by means of a tripod screw receiving socket, to which the terminal d is connected, and tripod screw element to which the terminal g is connected. The terminals d, e and f and terminals g, h and i are of course in fixed positions in their respective circuits. Thus, with the means of the invention, by the action of positioning of the drive means with respect to the camera the requisite connection between electrical circuits is automatically effected, and a separate step for producting an accurate connection between the circuits is unnecessary whereby servicing work is simplified and costs are reduced.

The reason for the provision of variable resistor R4 is as follows. Voltage applied to relay R falls considerably at the moment of starting of motor M, and because of this fall in voltage, the drive force of voltage source E1 falls, and internal resistance becomes large. Therefore, when voltage source E1 becomes weak, starting of motor M may cause the voltage applied to relay R to fall below the excitation limit voltage, with the result that relay R become deenergized. If this happens, the power supply to motor M is cut off, permitting voltage applied on relay R to return to a value above that of the excitation limit voltage, thus resulting in re-energization of relay R and re-starting of motor M. In other words, oscillations are liable to be produced in relay R and there is also a risk of damage to switch S6 controlled by relay R. However, by suitable adjustment of variable resistor R4, it can be ensured that, when the drive voltage supplied by voltage source E1 has fallen below a set level and there is a risk of oscillations occurring in relay R, the fall in voltage due to starting of motor results in voltage applied through silicon controlled rectifier SCR falling to a level below the self-maintaining voltage level of the series circuit including silicon controlled rectifier SCR and relay R whereby, since capacitor C1 is discharged, the silicon controlled rectifier is cut off and relay R is deenergized. That is, oscillation of relay R does not occur. Further, if the voltage applied to motor M becomes very small, the drive torque of motor M is reduced and, despite current flowing through motor M, can become insufficient to drive the film wind-up and shutter charge mechanism, with the possible result of overheating of the coil of motor M or damage to motor M. However, this can be avoided by adjusting variable resistor R4 in such a manner that voltage applied to silicon controlled rectifier SCR in the above described switching circuit falls below the value necessary to maintain the circuit active before the voltage applied to motor M falls below a value required for production of sufficient drive torque for actuation of the wind-up and charge mechanism. If the switching circuit is rendered inoperative in the above described manner, light emissive diode LED, of course, remains continuously activated and emits light to provide an indication of a fault.

Reference is now made to FIG. 6, which shows another embodiment of the present invention in which wind-up and shutter charge mechanism drive elements mounted as portions of the camera proper, shown in the upper portion of the drawing, comprise a wind-up lever 121 which is externally actuable and is integrally attached to an causes counter clockwise rotation of plate 123. When plane 123 is rotated by lever 121, a side of a cut-out portion 123a thereof presses against a pin 125a which is integrally attached to connection plate 125, whereby plate 125 is caused to rotate counterclockwise as seen in the drawing. There is no engagement between pin 125a and wind-up plate 123 when wind-up is effected electrically.

When plate 125 is in an initial position as shown in the drawing, pin 125a attached thereto holds a normally open switch S"2 closed, which switch S"2 is provided in a control circuit, described later, and corresponds to switch S'2 in FIG. 3. Plate 125 is rotated counterclockwise anticlockwise, either by actuation of lever 121 or by electrical drive means described later, during wind-up and shutter charge action and, during counterclockwise rotation of plate 125, pin 125a moves out of contact with switch S"2 which therefore opens.

Plate 125 is fixedly or integrally mounted on the end of shaft 129a, on the opposite, lower end of which is fixedly attached coupling element 129 for connection to coupling element 10 in drive means which is similar to that described with reference to FIG. 1, but further includes intermediate gear 8a between gears 7 and 8 and positioning element 201 as shown in the lower portion of FIG. 6, and to a central portion of which is fixedly attached a charge plate 127. A wire spring 127a which has one end attached to a pin fixedly attached to and projecting from the surface of plate 127 and is wound around shaft 129a, the opposite end of which is attached to a fixed portion of the camera interior, exerts a constant force to return plates 125, 127 and 129 in clockwise rotation to initial positions, this movement being assisted by the above described spring 18 in the drive means. When connection plate 125 is returned to its initial position, pin 125a closes switch S"2.

Independently of the above described elements, there is provided in the camera an externally actuable shutter button 141 which releases the camera shutter (not shown) in a conventionally known manner and comprises a stem-like portion to which is attached one end of a spring 141a the other end of which is attached to a wall portion of the camera, for example. This spring 141a urges the shutter button to return to an initial position upon release of externally applied pressure. Also, attached to another stem-like portion of the shutter button 141 is an actuation rod 141b which closes a normally open switch S2' which is provided in a control circuit described later and corresponds to swtich S2 of FIG. 3. Switch S2' is closed by rod 141b when shutter button 141 is depressed, but is uncontacted by rod 141b and opens when shutter button 141 is returned to its initial position by spring 141a.

Figure 8:
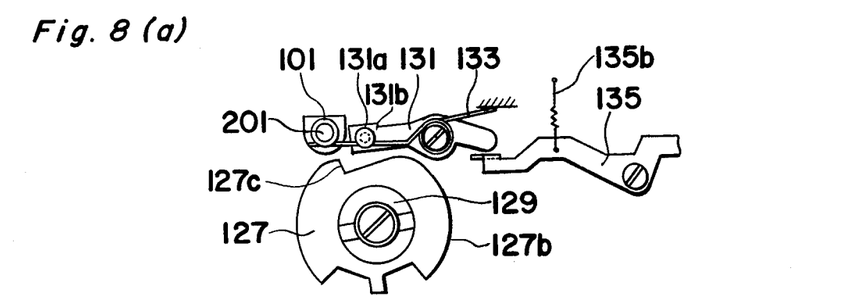
FIGS. 8(a)–8(c) are plan views showing the action of the control means of FIG. 7.

As shown in FIGS. 8(a)-8(c), charge coupler plate 127 has a radially disposed projection which engages film wind-up and shutter charge means (not shown) and also has a step portion 127c which can be engaged by a stop lever 131.

Figure 7:
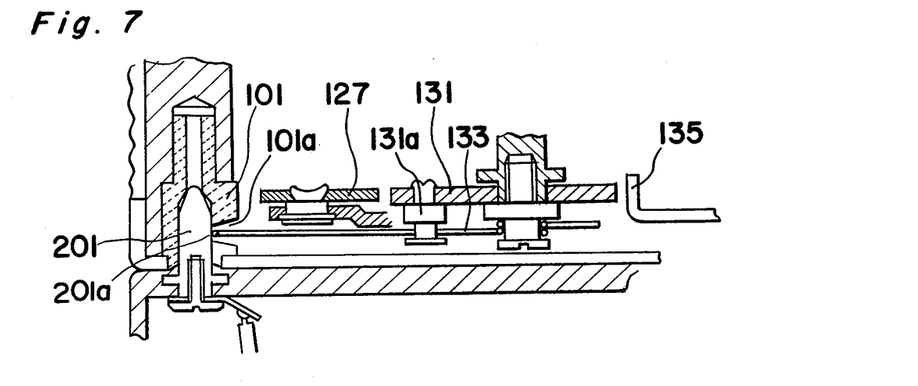
FIG. 7 is a cross-sectional view of positioning ane electrical connection control means employed in the means of FIG. 6.

Referring to FIGS. 6 and 7, stop lever 131 is mounted so that it is pivotable about a generally central point thereof. One end 131b of stop lever 131 has a shape generally corresponding to that of the stop portion 127c of coupler plate 127 and has a pin 131a fixedly attached to and projecting downwardly therefrom. Pin 131a is contacted by one arm of a rod spring 133, which exerts a constant force to rotate stop lever 131 counterclockwise to a position in which lever end 131b cannot engage step portion 127c of coupler plate 127. Rod spring 133 has an end portion which may move into an opening 101a in a guide element 101 to contact a positioning element 201 in the guide element 101.

The opposite end of stop lever 131 is contacted by one end of a stop actuation lever 135, which is pivotally mounted and is constantly urged to rotate counterclockwise by spring 135b and the opposite end 135a of which is contactable by means A which forces actuation lever 135 to rotate clockwise against the force of spring 135b upon completion of taking a photograph, but disengages from the lever end 135a when wind-up of film and shutter charge are completed.

Thus, upon termination of action for taking a photograph, since actuation lever 135 is pivotaed clockwise, rod spring 133 is not prevented from moving stop lever 131 counterclockwise to a position in which lever end 131b is not in a position to engage step portion 127c of coupler plate 127 whereby plates 125, 127 and 129 can be rotated. At the same time, rod spring 133 comes into contact with positioning element 201 in guide element 101, as shown in FIG. 8a. During rotation of plates 125 and 127 and element 129 to effect film wind-up and shutter charge action, a peripheral portion 127b of coupler plate 127 pushes against and causes further movement of stop lever 131 away from an engagement position. At this time rod spring 133 remains in contact with positioning element 201 due to its spring force and there is produced a slight clearance d between rod spring 133 and pin 131a attached to stop lever 131 as shown in FIG. 8(b).

When plate 127 has been rotated a sufficient distance to effect completion of film wind-up and shutter charge action, the end 135a of lever 135 is disengaged, spring 135b causes actuation lever 135 to pivot counterclockwise and actuation lever 135 causes stop lever 131 to turn clockwise against the force of spring 133 to a position in which the end 131b of stop lever 131 may engages the step portion 127b of coupler plate 127, stopping counterclockwise movement of plates 125 and 127 and element 129. When stop lever 131 is moved to this position, pin 131attached thereto causes rod spring 133 to move out of contact with positioning element 201 in guide element 101 as shown in FIG. 8(c).

Guide element 101 is fixedly attached to the camera and positioning element 201 is similarly attached to case 24 of the above described drive means. Insertion of positioning element 201 in guide elelement 101 thus serves to position the drive means correctly with respect to the camera. Positioning element 201, or at least portion 201a thereof which comes into line with the opening 101a in guide element 101, is made of conductive material and, when positioning element 201 is inserted in guide element 101, portion 201a thereof connects to a line in a control circuit. Rod spring 133 connects, via flexible connection means (not shown) to the control circuit and together with positioning element 201 constitutes a switch S4' serving to open or close this circuit line. Switch S4' corresponds to switch S4 in the cirict of FIG. 3 and is included in the control circuit for the means of FIG. 6.

Figure 9:
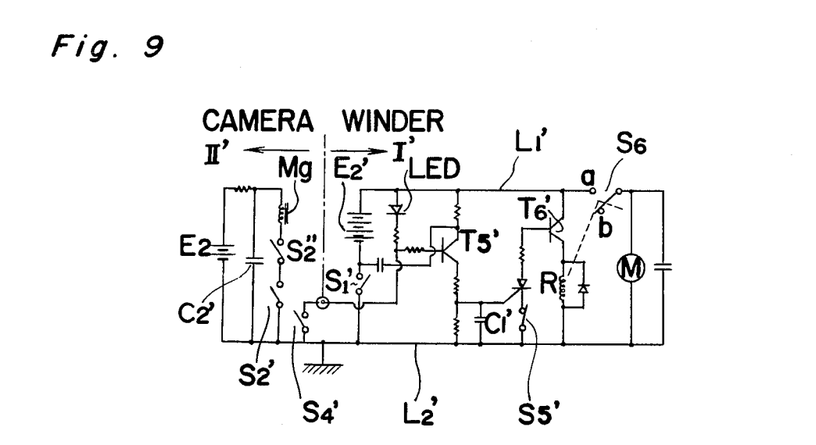
FIG. 9 is a circuit diagram of a control circuit employable in association with the means of FIG. 6.

This control circuit, as shown in FIG. 9, comprises circuit I' provided in the drive means and circuit II' provided in the camera. Circuit I' comprises voltage source E1' having a negative terminal connected through normally open main switch S1' to line L2', a positive terminal connected to line L1' leading to contact a of switch S6 which is normally closed on another contact b and is caused to close on contact a to connect drive motor M to the power supply circuit upon energization of relay R. The relay R is provided in a self-maintaining circuit, such as described with reference to FIG. 3, including PNP transistor T6', a silicon controlled rectifier, and normally closed switch S5' which can be opened by lever 16 in the drive means of the invention. The gate of the silicon controlled rectifier is connected to the junction of resistors forming a voltage divider in series with the collector of PNP transitor T5' the emitter of which is connected to line L1 and through a capacitor C1' to the negative terminal of voltage source E1 and the base of which is connected to the junction of the cathode of light emitting diode LED and switch S4' constituted by rod spring 133 and positioning element 201. When closed, switch S4' provides connection to line L2' and ground. Main switch S1' may be closed by external action or may be automatically closed when the drive means is mounted on the camera.

Circuit II' serves to causes shutter action and comprises voltage source E2, the negative terminal is connected directly to line L2' and which is in parallel with a capacitor C2', and a series circuit including the coil of shutter control electromagnet Mg, having an upper end connected to the positive terminal of voltage source E2', and normally open switches S'2 and S"2 provided between the lower end of the coil of electromagnet Mg and line L2', switch S"2 being open during wind-up and shutter charge action and being closed by pin 125a attached to plate 125 at the end of wind-up and charge action while switch S2' is closed upon depression of shutter button 141.

Figure 10:
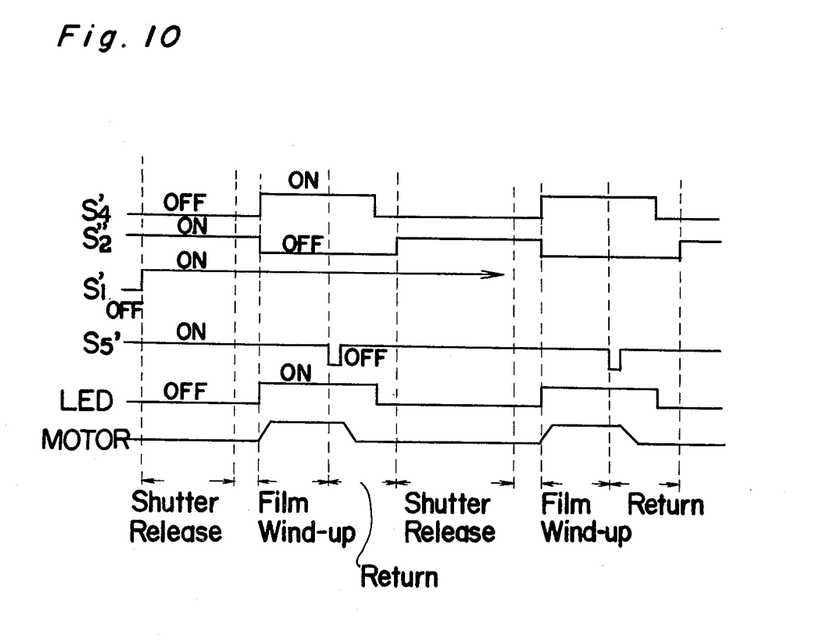
FIG. 10 is a timing chart of actions effected in the means of FIG. 6 and the circuit of FIG. 9.

Referring to FIGS. 9 and 10, the operation of the above described circuit is as follows. Assuming that main switch S1' is closed and that previous wind-up and shutter charge action is completed, capacitors C1' and C2' are charged and switch S"2 is closed. When shutter button 141 is depressed, switch S2' also is closed and electromagnet Mg is energized to allow shutter movement for exposure of a film frame. Upon completion of shutter action, rod spring 133 and positioning element 201 come into contact, thus closing switch S4' whereupon light emitting diode LED lights up, capacitor C1' discharges and there is large current flow through transistor T5', resulting in triggering of the silicon controlled rectifier, energization of relay R, switching of switch S6' to contact a, and actuation of motor M to effect film wind-up and shutter charge action. When this action starts, switch S"2 opens, thus terminating action of shutter control circuit II; and permitting recharging of capacitor C2' to be effected.

Upon completion of wind-up and charge action, switch S5' is opened by lever 16, whereupon switch S6' is returned to contact b as described above. Also, switch S4' is opened upon completion of this action, thus permitting recharging of capacitor C1' to be effected. Therefore, if the photographer keeps shutter button 141 depressed in order to take photographs in continuous succession, switch S2' remains closed and when switch S"2 is released by pin 125a upon return the drive elements to initial positions, the above described action is repeated. On the other hand, if a fault occurs and wind-up and shutter charge fail to be completed correctly, switch S5' is opened after one revolution of support plate 4 but end 135a of stop actuation lever 135 remains engaged and switch S4' remains closed, thus causing continuous conduction of transistor T5' and preventing recharging of capacitor C1'.

Needless to say in the above described control circuits, the silicon controlled rectifier may be replaced by a suitable transistor circuit.

Although the present invention has been fully been described with reference to the accopanying drawings, it is to be noted that various changes and modifications will be apparent to those skilled in the art, such changes and modifications being to be understood as being included within the scope of the present invention unless they depart therefrom.

What is claimed is:

1. A camera comprising a guide member having a hollow recess opening out of said guide member; fastening member receiving means; a film wind-up and shutter charge mechanism operable to feed a film past an exposure station subsequent to exposure of the film and having a coupling member; signal means having a movable contact movable in response to termination of exposure from a first position outside said hollow recess to a second position in said hollow recess subsequent to termination of exposure;
   a camera drive unit having;
   a fastening member receivable in said fastening member receiving means to fasten said drive unit onto said camera,
   a single positioning element receivable in said hollow recess in said guide member when said fastening member is received in said fastening member receiving means for acting together with said fastening member for positioning said camera drive unit relative to said camera, said single positioning element having an electrically conductive member capable of contacting said movable contact when said positioning element is received in said hollow recess in said guide member and when said movable contact moves to its second position,
   a drive mechanism couplable with said coupling member when said fastening member and said positioning element are received in said fastening member receiving means and said hollow recess in said guide member, respectively, for driving said film wind-up and shutter charge mechanism, and
   an electric circuit connected to said drive mechanism and having an input connected to said conductive element of said positioning element and actuated for actuating said drive mechanism in response to the contact of said conductive member with said movable contact; and
   a stop member engageable with said film wind-up and shutter charge mechanism to prevent a film wind-up and shutter charge action at least during the period of exposure and means for disengaging said stop member from said film wind-up and shutter charge mechanism subsequent to termination of exposure, and wherein said stop member is associated with said signal means for moving said movable contact from said first to said second position upon the disengagement of said stop member from said film wind-up and shutter charge mechanism.

2. A drive unit as claimed in claim 1, wherein said signal means includes an electrically conductive wire spring having a portion constituting said movable contact, said wire spring having sufficient resiliency for bringing said portion into said hollow recess in said guide member and being engageable with said stop member for moving out of said hollow recess in said guide member against the resiliency thereof when said stop lever engages said film wind-up and shutter charge mechanism.

3. A drive unit as claimed in claim 2, wherein said wire spring is grounded to said camera, whereby said electric circuit is activated when said input terminal is grounded through said wire spring and said conductive member of said positioning element.

4. A camera drive unit as claimed in claim 1, wherein said electric circuit includes a motor for driving said drive mechanism, and further comprises a clutch releasably coupling said motor with said drive mechanism for decoupling said motor from said drive mechanism when an excessive load is imposed on said clutch, and switching means connected in the power supply to said motor and operatively associated with said clutch for being operated for interrupting the power supply subsequent to the decoupling of the motor from said drive mechanism, whereby when said film wind-up and shutter charge mechanism stops upon termination of one-frame film wind-up an excessive load is imposed on said clutch through said coupling member and said drive mechanism.

5. A camera drive unit as claimed in claim 4, wherein said switching means includes a switch positioned to be operated for interruption of the electric power supply to said motor when said motor is at a predetermined phase position displaced from the position wherein said clutch decouples said motor from said drive mechanism.

6. A camera drive unit as claimed in claim 5, wherein said electric circuit includes a self-maintaining semiconductor switching circuit and a trigger circuit for rendering said switching circuit conductive in response to the contact of said conductive member with said movable contact, for causing supply of power to said motor, said switch switching off said switching circuit upon the operation thereof.

7. A camera drive unit as claimed in claim 6, wherein said electric circuit includes a relay actuable when said switching circuit becomes conductive, said relay controlling the electric power supply to said motor.

8. A photographic camera comprising:
a camera body having driven means therein;
a guide member provided on said camera body and having a hollow recess therein;
first circuit means provided in said camera body and having a movable first electrical terminal responsive to termination of an exposure by the camera so as to move into said hollow recess of said guide member and further having means for generating at said first electric terminal an electric signal representative of termination of an exposure operation of the camera;
a drive unit having a motor driven camera drive mechanism;
means for releasably attaching said drive unit to said camera body;
a single positioning element provided on said drive unit and cooperable with said attaching means for positioning said drive unit in a predetermined positional relation with respect to said camera body such that said driven means is coupled with said camera drive mechanism, said single positioning element being receivable in said hollow recess of said guide member for the positioning of said drive unit when said drive unit is attached to said camera body and having a fixed second electrical terminal with which said first electrical terminal comes into contact when said single positioning element is in said hollow recess of said guide member and said first electrical terminal moves into said hollow recess of said guide member, said electric signal from said first circuit means being transmitted to said second electrical terminal upon the contact of said first electrical terminal with said second electrical terminal; and
a second circuit means provided in said drive unit and having a drive control circuit connected to said motor driven camera drive mechanism and having said second electric terminal as an input thereof and activated for driving said motor driven camera drive mechanism upon receipt of said electric signal.

9. A photographic camera as claimed in claim 8 in which said driven means includes a film wind-up and charge mechanism provided in said camera body for feeding a film past an exposure station and a coupling member provided on said camera body and connected to said film wind-up and charge mechanism for driving said wind-up and charge mechanism in response to the rotation of said coupling member;
and in which said drive mechanism is coupled with said coupling member for rotation thereof when said drive unit is attached to said camera with said single positioning element received in said hollow recess of said guide member.

10. A photographic camera as claimed in claim 9, further comprising a clutch releasably coupling said motor with said drive mechanism for decoupling said motor from said drive mechanism when an excessive load is imposed on said clutch, and switching means connected in the power supply to said motor and operatively associated with said clutch for being operated for interrupting the power supply subsequent to the decoupling of said motor from said drive mechanism, whereby when said film wind-up and charge mechanism stops upon termination of one frame film wind-up an excessive load is imposed on said clutch through said coupling member and said drive mechanism.

11. A photographic camera as claimed in claim 10, wherein said switching means includes a switch positioned to be operated for interruption of the electric power supply to said motor when said motor is at a predetermined phase position displaced from the position where said motor is decoupled from said drive mechanism.

12. A photographic camera as claimed in claim 11, wherein said drive control circuit includes a self-maintaining semi-conductor switching circuit which is rendered conductive in response to said electric signal for causing supply of power to said motor and being switched off upon the operation of said switch.

13. A photographic camera as claimed in claim 12, wherein said drive control circuit includes a trigger circuit for triggering the switching circuit, said trigger being constituted by a discharge circuit including a capacitor which is charged upon completion of the film wind-up and shutter charge action, said discharge circuit being actuated in response to said electric signal to trigger said switching circuit.

14. A photographic camera as claimed in claim 12, wherein said drive control circuit includes a relay actuable when said switching circuit becomes conductive, said relay controlling the supply of the electric power to the motor.

* * * * *